(12) United States Patent
Molina et al.

(10) Patent No.: US 9,941,835 B2
(45) Date of Patent: Apr. 10, 2018

(54) MANUAL SNAP-ON PHOTOVOLTAIC MOUNTING SYSTEM FOR RAPID INSTALLATION OF PHOTOVOLTAIC ARRAYS ONTO METAL ROOFS

(71) Applicant: SolarCity Corporation, San Mateo, CA (US)

(72) Inventors: David Molina, San Rafael, CA (US); Tyrus Hudson, San Rafael, CA (US); William Paul Buchanan, Oakland, CA (US)

(73) Assignee: SolarCity Corporation, San Mateo, CA (US)

( * ) Notice: Subject to any disclaimer, the term of this patent is extended or adjusted under 35 U.S.C. 154(b) by 72 days.

(21) Appl. No.: 14/836,807

(22) Filed: Aug. 26, 2015

(65) Prior Publication Data

US 2016/0359446 A1 Dec. 8, 2016

Related U.S. Application Data

(60) Provisional application No. 62/171,443, filed on Jun. 5, 2015, provisional application No. 62/203,822, filed on Aug. 11, 2015.

(51) Int. Cl.
*F16M 13/00* (2006.01)
*H02S 20/23* (2014.01)
*F24J 2/52* (2006.01)
*F16B 5/00* (2006.01)

(52) U.S. Cl.
CPC ............ *H02S 20/23* (2014.12); *F24J 2/5245* (2013.01); *F24J 2/5254* (2013.01); *F24J 2/5258* (2013.01); *F24J 2/5262* (2013.01); *F16B 5/008* (2013.01); *F16B 5/0084* (2013.01); *F24J 2002/5294* (2013.01); *Y02B 10/12* (2013.01); *Y02B 10/20* (2013.01); *Y02E 10/47* (2013.01)

(58) Field of Classification Search
CPC . H02S 20/23; F16B 5/0607; F16B 2005/0678
USPC ........... 248/154, 237, 547; 24/455; 52/173.1
See application file for complete search history.

(56) References Cited

U.S. PATENT DOCUMENTS

| | | | | |
|---|---|---|---|---|
| 8,627,617 B2 * | 1/2014 | Haddock | ................ | F24J 2/5249 136/251 |
| 9,097,443 B2 * | 8/2015 | Liu | ........................ | F24J 2/5258 |
| 9,166,524 B2 * | 10/2015 | West | ....................... | F24J 2/5205 |
| 9,243,817 B2 * | 1/2016 | West | ....................... | F24J 2/5211 |
| 2007/0212935 A1 * | 9/2007 | Lenox | ..................... | F24J 2/5245 439/567 |

FOREIGN PATENT DOCUMENTS

| | | | | |
|---|---|---|---|---|
| EP | 1647782 A2 * | 4/2006 | ............. | F24J 2/5203 |
| EP | 2083203 A1 * | 7/2009 | ........... | F16L 25/0036 |

* cited by examiner

*Primary Examiner* — Gwendolyn W Baxter
(74) *Attorney, Agent, or Firm* — Kilpatrick Townsend & Stockton LLP

(57) ABSTRACT

A rapidly installable photovoltaic mounting system that can be manually snapped onto a first photovoltaic module and then lowered onto a trapezoidal metal roof to serve as a base for receiving a second photovoltaic module thereon.

9 Claims, 20 Drawing Sheets

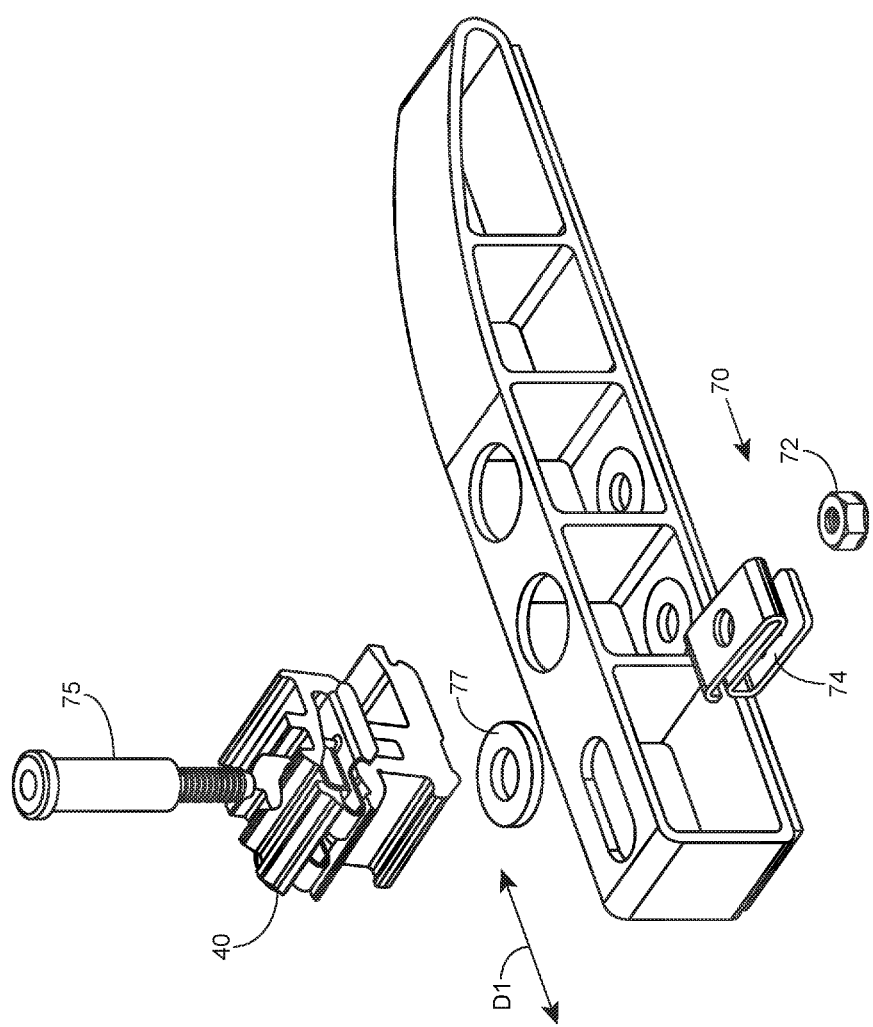

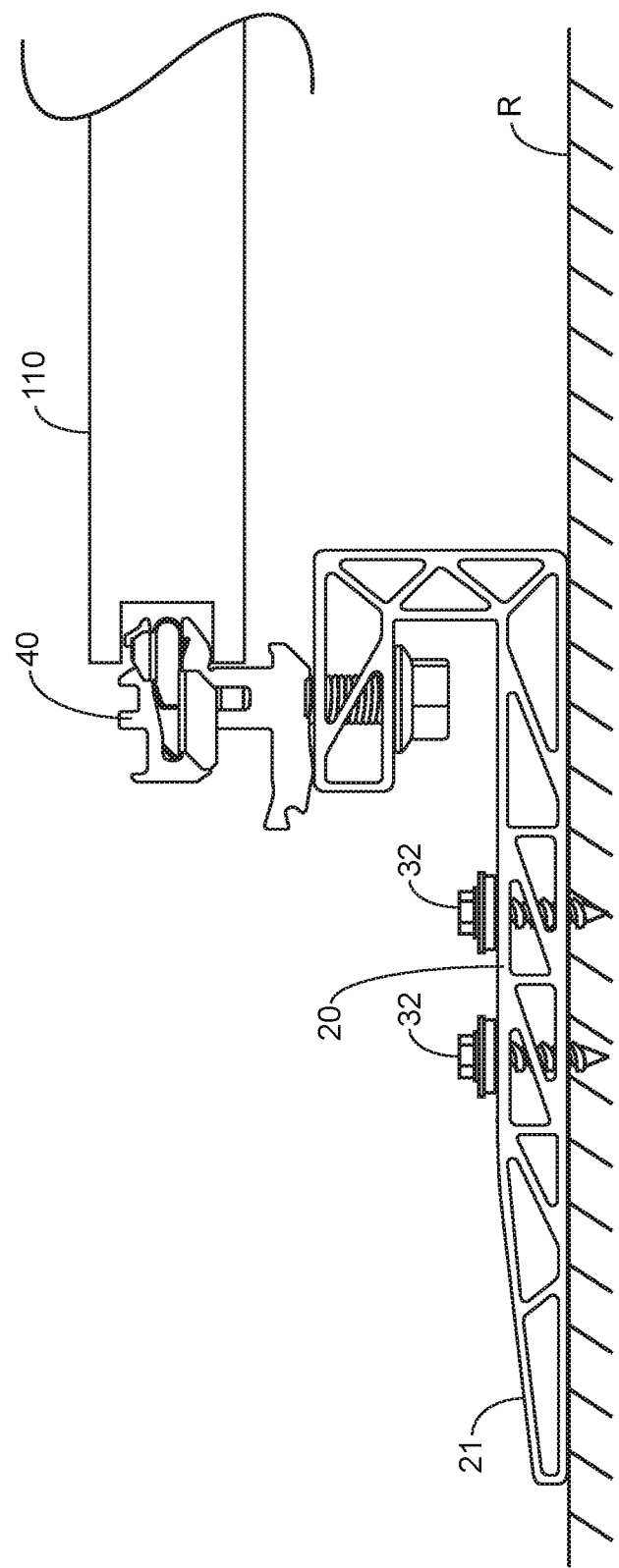

MANUAL SNAP-ON PHOTOVOLTAIC MOUNTING SYSTEM FOR RAPID INSTALLATION OF PHOTOVOLTAIC ARRAYS ONTO METAL ROOFS

RELATED APPLICATION

This claims priority to U.S. Provisional Patent Application No. 62/171,443, entitled "Manual Snap-On Photovoltaic Mounting System for Rapid Installation of Photovoltaic Arrays Onto Metal Roofs", filed Jun. 5, 2015; and U.S. Provisional Patent Application No. 62/203,822, entitled "Manual Snap-On Photovoltaic Mounting System for Rapid Installation of Photovoltaic Arrays Onto Metal Roofs", filed Aug. 11, 2015, both of which are incorporated herein by reference in their entirety for all purposes.

TECHNICAL FIELD

The present invention relates to mounting photovoltaic arrays.

BACKGROUND

Many systems currently exist for mounting photovoltaic arrays onto trapezoidal metal roofs (a roof type that is especially common in Europe). Unfortunately, these existing systems often are complex, involve many parts and take an undesirably long time to install. Moreover, the installation of these systems typically requires specialized tools, or a number of different tools. What is instead desired is a mounting system that can be installed very rapidly on a metal roof and is also easily handled by an installer.

Trapezoidal roof mounting systems are not secured into building rafters. Instead, they are usually secured to the metal roofing material itself above the rafter. This is because the rafters typically nm perpendicular to the peaks of the metal roofing material. As a result, these systems must be firmly attached directly to the metal roofing surface. In most existing systems, screws are inserted through the metal roof, which can present several problems. First, working with small screws typically involves the installers fumbling with parts during the installation, as the installer tries to position and fasten them, but it is also important that the screw-to-metal-roof connection be sufficiently strong so that the array is held firmly in place. Second, a problem with existing systems is that they need to have sufficient flexibility to account for movement of parts of the array caused by thermal expansion and contraction. This problem is not typically well addressed in mounting systems that are simply screw-fastened onto metal roofs. Third, existing trapezoidal roof mounting systems typically require excessive time to install, due to the number of parts required. Fourth, existing trapezoidal roof mounting systems do not typically address module-to-module grounding since separate grounding wires typically need to be attached to the mounting system.

SUMMARY

The present system provides a photovoltaic mounting system that can be manually installed easily. It is fast to use in the field. The present system can include a single assembly that can be installed in a simple continuous motion. All of the fastening mechanisms used both to connect one photovoltaic module to another and to connect the photovoltaic array to the roof can be contained within the handheld assembly itself. As a result, no extra fasteners or components are needed.

During installation, one embodiment of the present assembly can be snapped onto the edge of a first photovoltaic module when the edge of the module is held up in the air by the installer. The assembly can then be lowered onto the roof and attached to it. After the assembly is attached, it can provide a convenient platform for a second photovoltaic module to be attached thereto. This process can be repeated such that an array of photovoltaic modules can be quickly laid out on the roof.

The present system is well suited for use with trapezoidal metal roofs, and may include a pair of self-tapping screws that permit its direct attachment. Several optional systems are provided for keeping the self-tapping screws from falling out of the mounting assembly during installation. As a result, the installer can manually snap the mounting system onto the first module and then lower the module onto the roof and then secure the mounting assembly without the danger of losing or fumbling with the screws.

In one embodiment, the assembly has a narrow elongated base that can be easily held by the installer with one hand wrapped around the base of the assembly. This can allow the base to be used as a lever when rotating the assembly to lock the assembly onto the side edge of the first photovoltaic module.

Preferably as well, the present assembly permits some module-to-module movement/alignment during and after installation of the array. This can be accomplished by a module-to-module connector that may optionally slide, pivot and/or rotate slightly with respect to the main body of the assembly.

A further advantage of the present system is that it can used to design an array that does not require module-to-module interlocks (e.g.: interlocks that are not supported from below) in addition to supporting feet that connect one module to another. Traditional arrays involve two different structures—feet that support the array above the roof (that typically also connect modules together), and interlock connectors that connect modules together (but are not supported from below). The use of these two different structures has become a common way to position the feet that support the array at locations that may best correspond to (preferred connector spacings. However, with the present system, only one type of connector assembly is used. Preferably, the present connector is positioned to support each module at four locations around its frame, with the need for secondary module-to-module interlock-style connectors avoided and the ability to position the present assembly not being tied to the rafter locations.

BRIEF DESCRIPTION OF THE DRAWINGS

FIG. 11 is an exploded perspective view of an embodiment of the assembly having a captive nut and nut holder.

FIG. 15D is a fourth step in assembling a photovoltaic array using the present mounting system.

DETAILED DESCRIPTION OF THE DRAWINGS

The present system can provide a mounting assembly for simple installation of photovoltaic module arrays, and is well suited for (but not limited to) use with trapezoidal metal roofs. During installation, the present assembly can be manually snapped onto a first photovoltaic module by an installer holding one end of the module in the air while also holding the present assembly with their other hand. Next, the assembly can be attached to the roof (while the assembly supports the first module thereon). Then, a second module can be attached onto the assembly in preferred embodiments, the attachment technique to the first and second modules involves rotation of the modules with respect to the assembly. As a result, the present system is easy and intuitive for an installer to use since a preferred method of installation may involve a continuous rotational movement of the installers hands. In preferred aspects, the assembly is rotated with respect to the first module to fasten the assembly to the first module. Thereafter, the second module can be rotated with respect to the assembly to fasten the second module to the assembly. By repeating this preferred method of assembly, a plurality of photovoltaic modules can be laid out in a column upon a roof. Advantageously, the installer need not reach back over an installed module after the module has been positioned in the array. This affords the installer the ability to work in one continuous direction quickly, and without stretching across the top of a photovoltaic module after the module has been installed.

Figure 1:
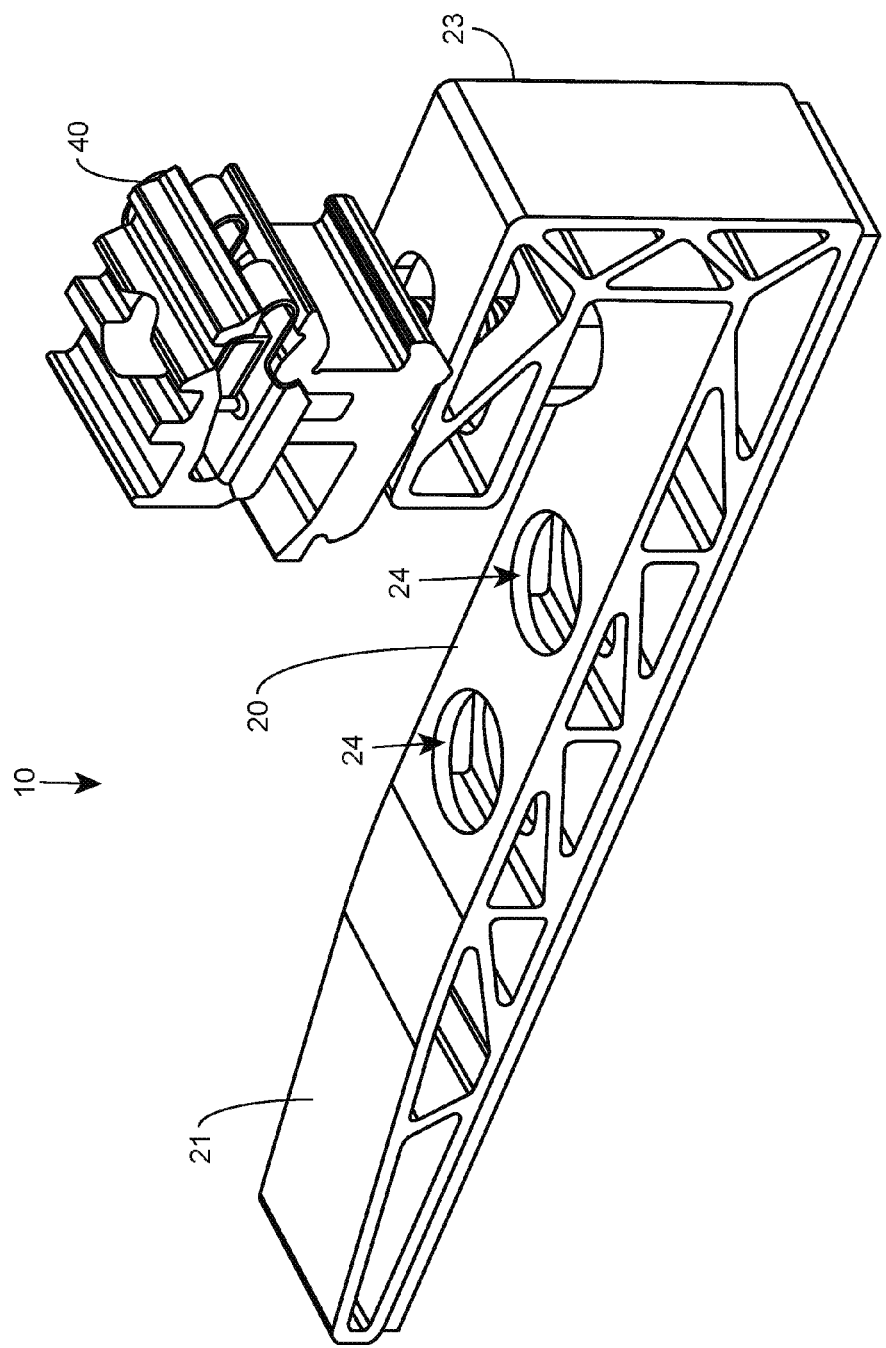
FIG. 1 is a perspective view of the present mounting assembly.
Figure 2:
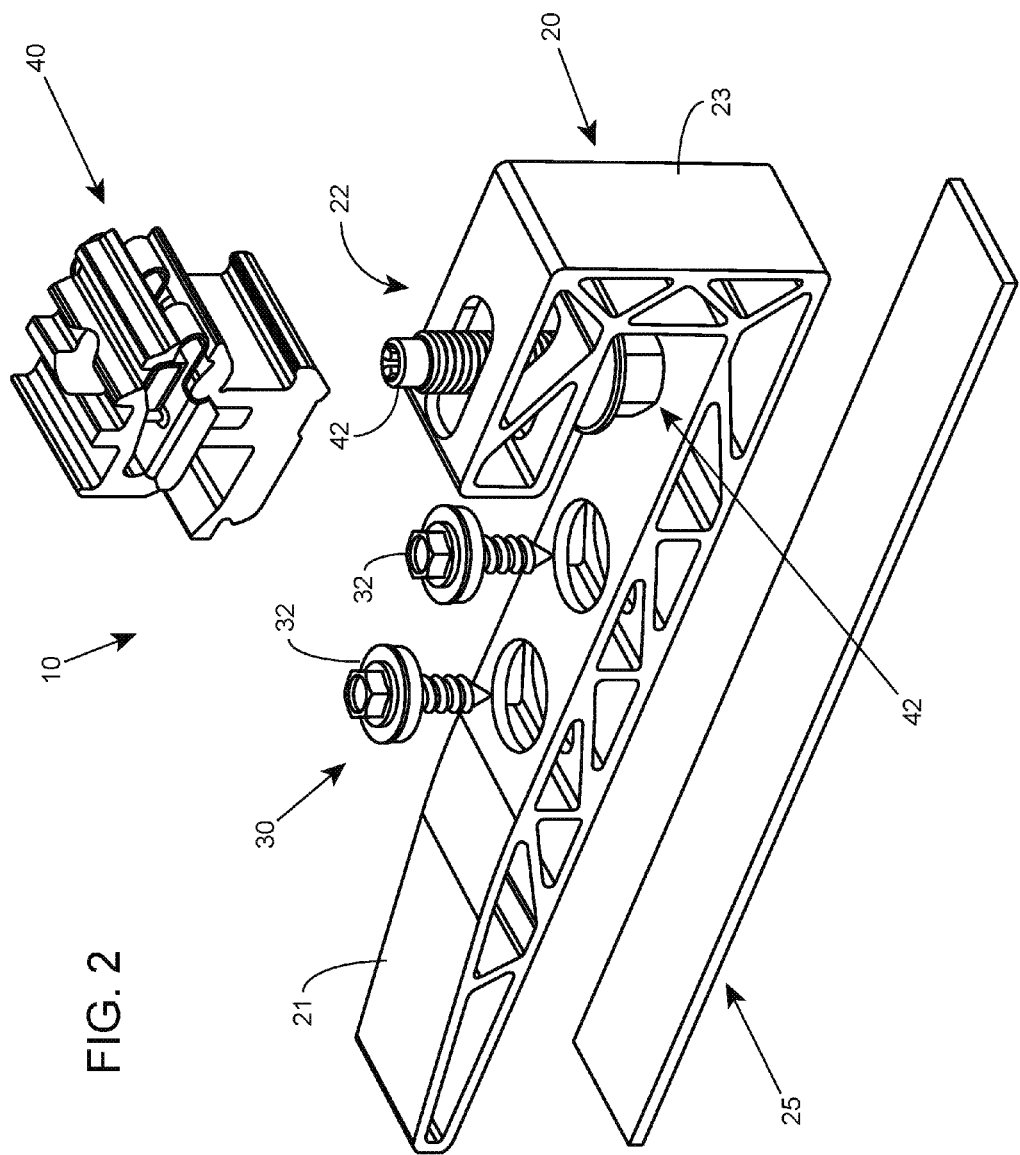
FIG. 2 is an exploded perspective view of the system of FIG. 1.
Figure 3:
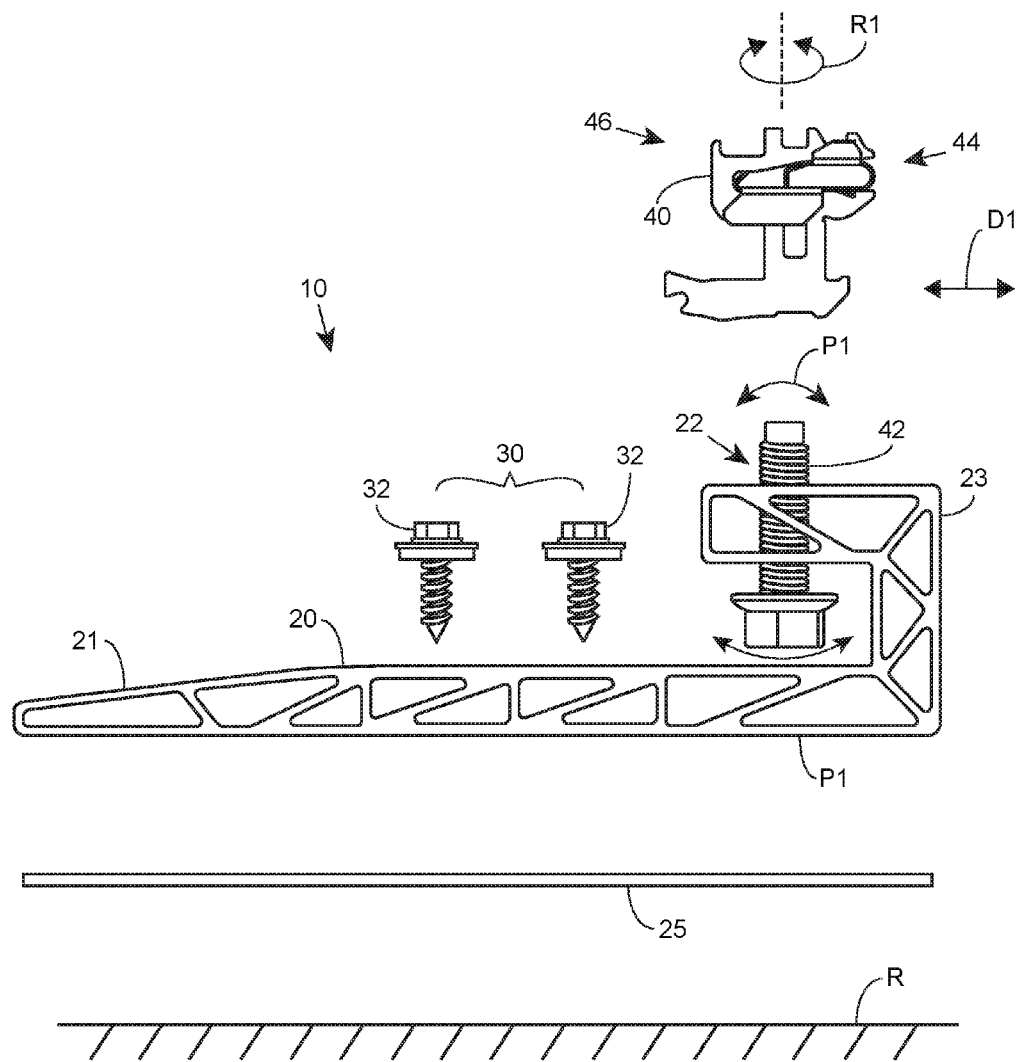
FIG. 3 is a side elevation view of the system of FIG. 1.
Figure 4:
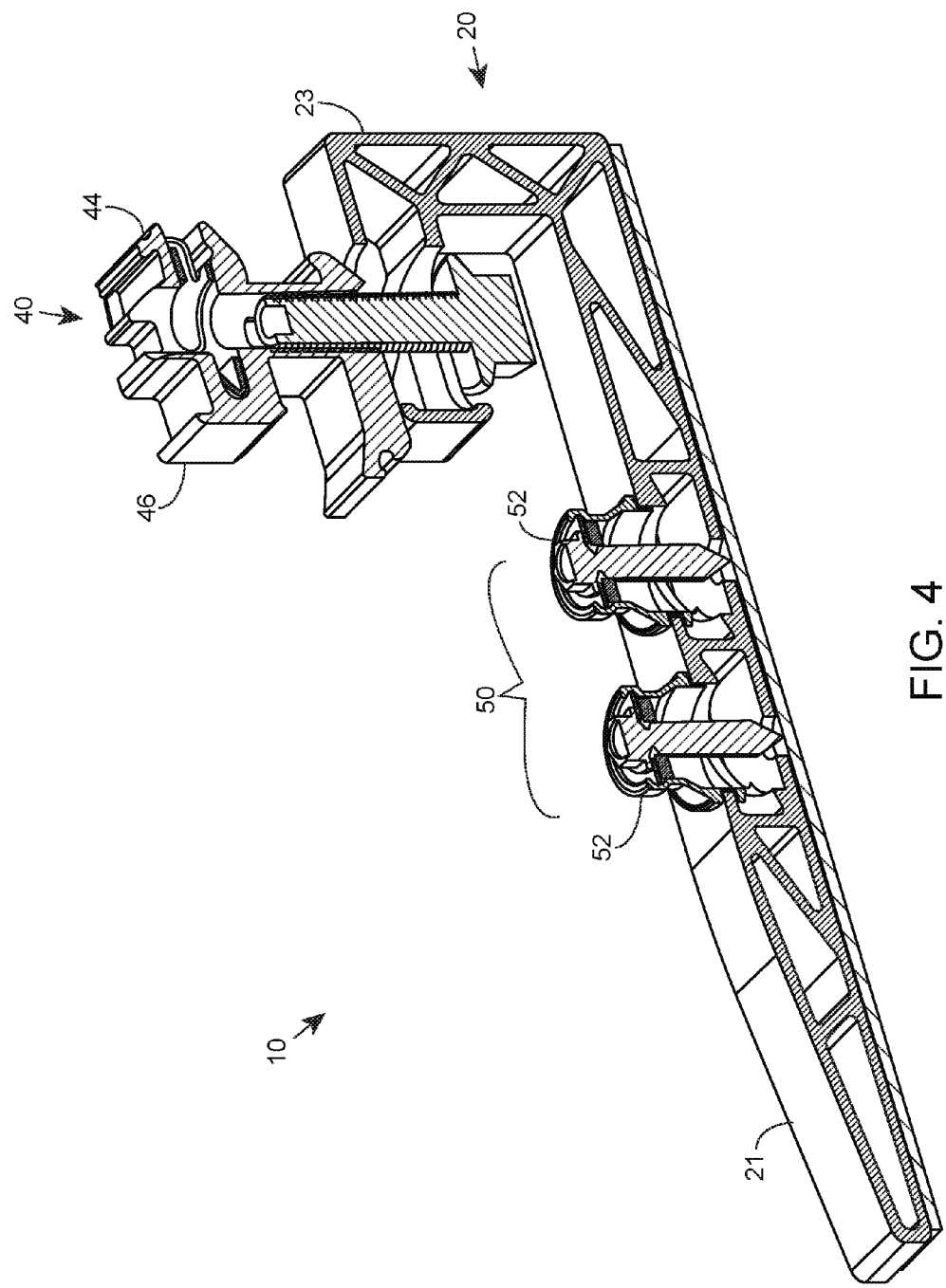
FIG. 4 is a perspective sectional view of the assembly showing an optional rubber gasket system for attaching a pair of self-tapping screws to the elongated base.
Figure 5:
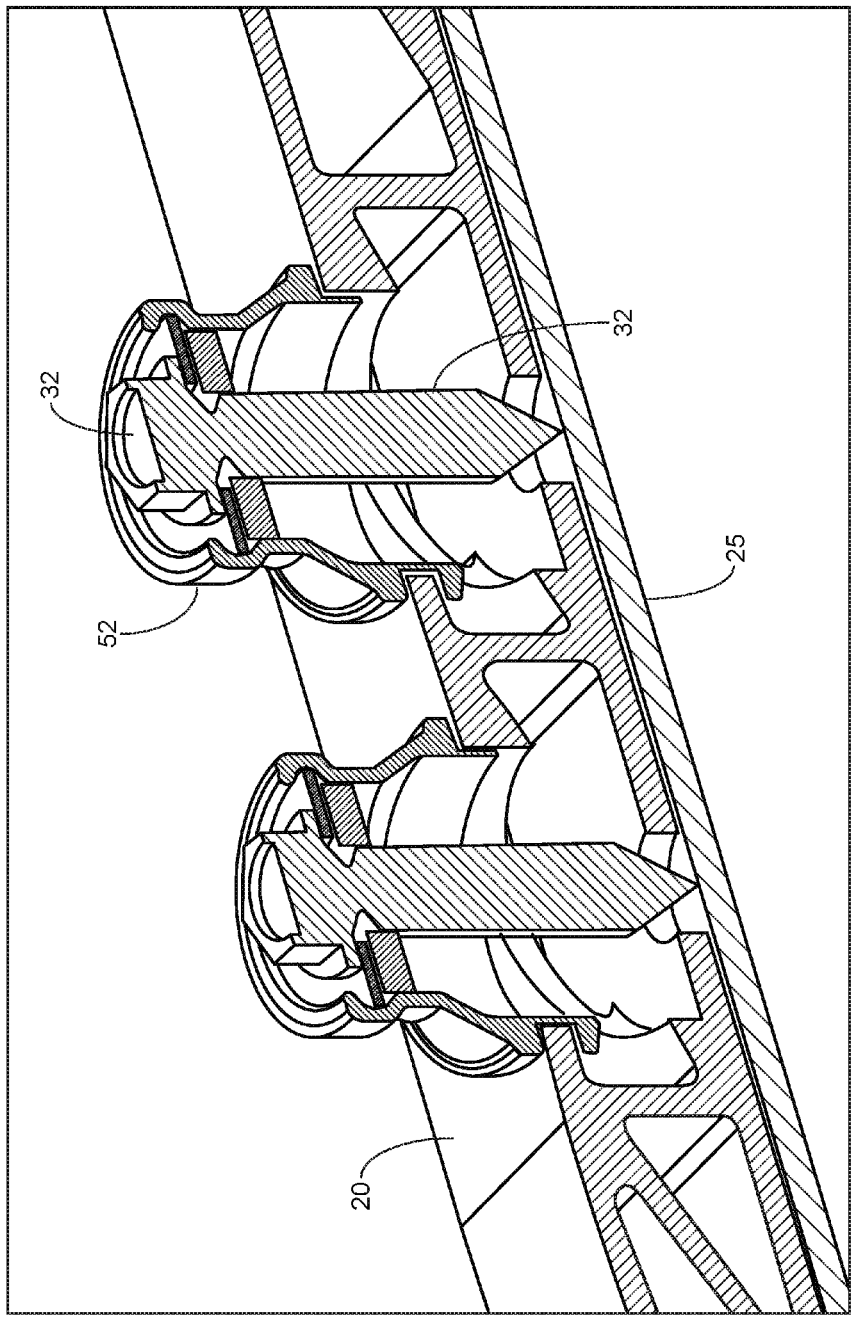
FIG. 5 is a close-up view corresponding to FIG. 4.
Figure 6:
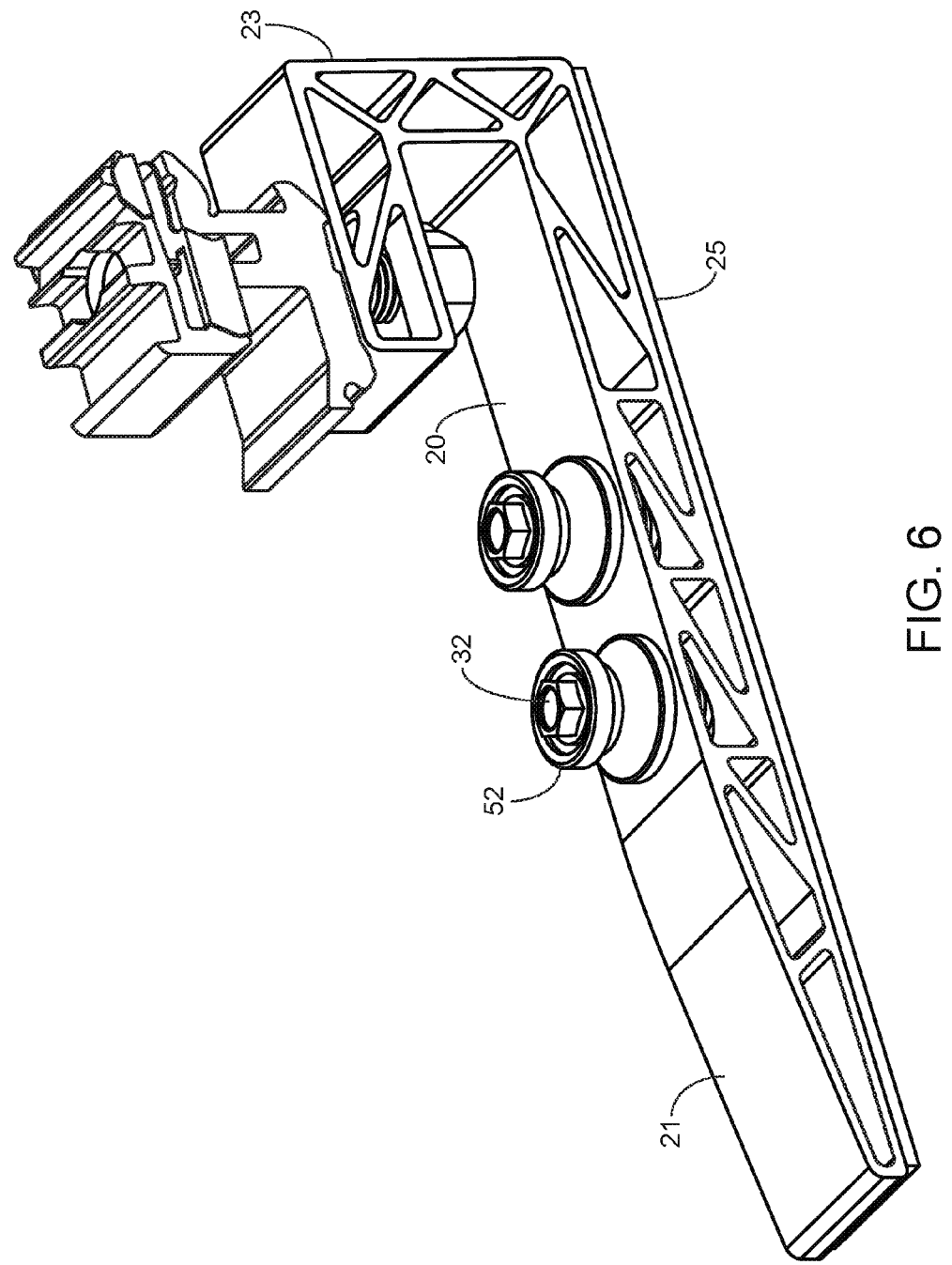
FIG. 6 is another close-up view corresponding to FIG. 4.
Figure 7:
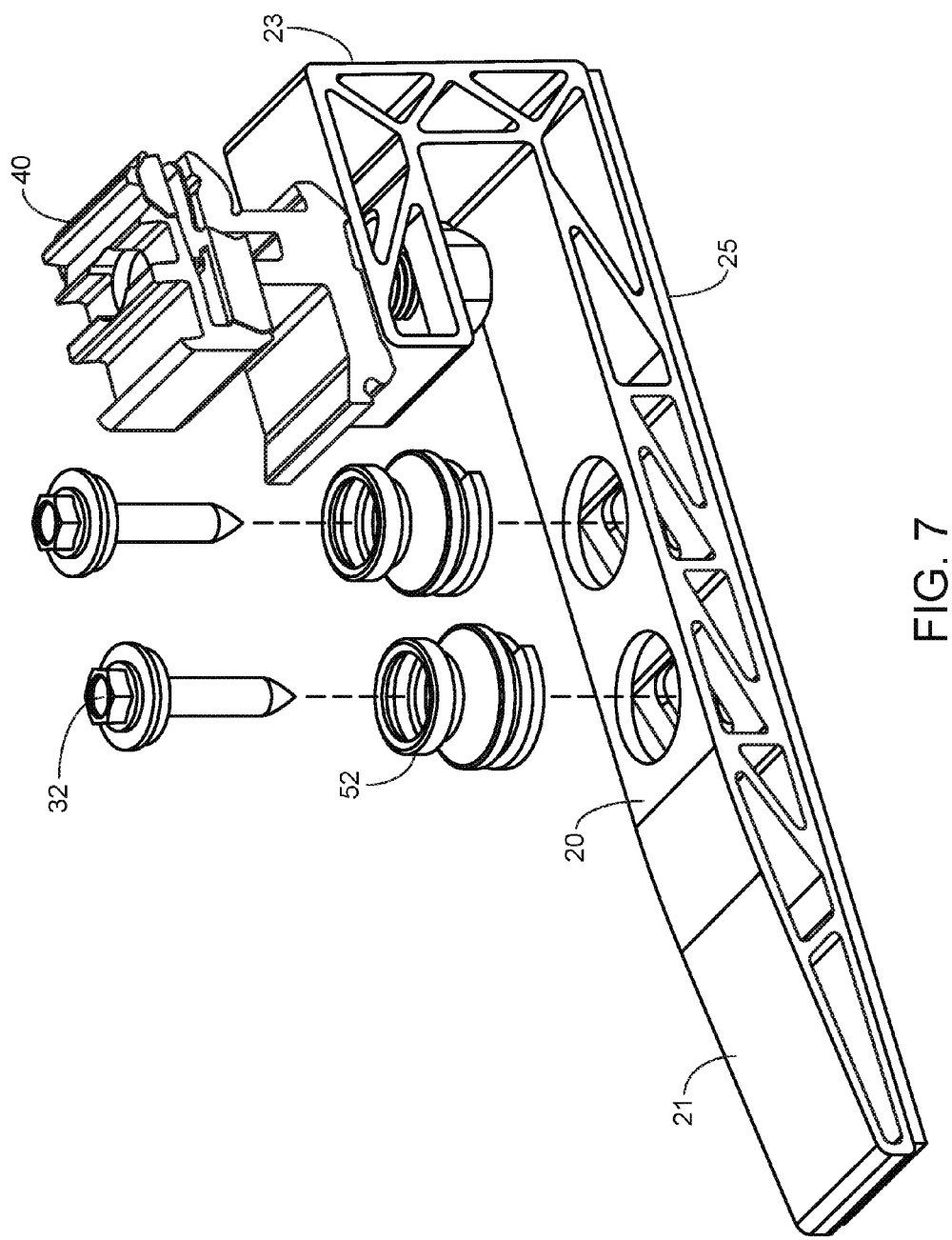
FIG. 7 is an exploded perspective view corresponding to FIG. 6.

FIGS. 1 to 3 show one embodiment of the present assembly. Mounting assembly 10 can include elongated base 20; attachment mechanism 30 (optionally being a pair of screws 32) on the elongated base for attaching the elongated base 20 onto roof R; and photovoltaic module-to-module connector 40. Elongated base 20 can be formed as an extrusion. This has the advantage of reducing the cost of fabrication, both due to the speed at which extrusions are made, and by using the present web-type structure, the amount of material required may also be reduced. Optional sealing base 25 can be provided on the bottom of base 20. Sealing base 25 may be made of rubber to provide a tight seal onto metal roof R. As best seen in FIG. 3, elongated base 20 may be generally J-shaped, with photovoltaic module connector 40 mounted onto hook end 23 of the J-shaped base. An advantage of using such a J-shape is that it acts as a fulcrum when manually rotating and thus attaching connector 40 to the modules. At the opposite end to the hook end 23 is narrow tapered end 21. As will be explained, an installer can hold onto tapered end 21 and use it as a lever when rotating hook end 23 of base 20. Screws 32 can hold base 20 onto the roof and photovoltaic module connector 40 can hold one photovoltaic module onto another.

Photovoltaic module connector 40 can be mounted at hook end 23 of elongated base 20 as shown. Connector 40 is dimensioned to support first and second photovoltaic modules (110 and 120 in FIGS. 13 to 15F) on opposite sides thereof. As will be explained below, and as illustrated in FIGS. 15A to 15F, photovoltaic module connector 40 may also be dimensioned to rotate to lock onto first photovoltaic module 110 when elongated base 20 is held and rotated downwardly by hand with respect to first photovoltaic module 110. In addition, as will also be explained in FIGS. 15A to 15F, photovoltaic module connector 40 is also dimensioned to receive the second photovoltaic module 120 thereon after elongated base 20 has been positioned onto the roof (and after photovoltaic module connector 40 has been fastened onto first photovoltaic module 110).

Preferably, attachment mechanism 30 for securing elongated base 20 onto the metal roof can include, for example, one or two or more self-tapping screws 32. As commonly understood, a self-tapping screw is a screw that forms its own hole as it is driven into it. An advantage of using self-tapping screws is that it bites into the metal and does not produce metal residue around the hole the screw drills. Rather, the metal is compressed laterally outwardly as the self-tapping screw is advanced. In alternate embodiments, a rivet can be used with the holes for the rivet being pre-drilled into base 20.

As soon as elongated base 20 (and optional rubber sealing base 25 therebelow) are sitting positioned on top of roof R, screws 32 may then be tightened to secure elongated base 20 directly onto the metal roof. Preferably, screws 32 attach only into the sheet metal of the metal roof R and not into the rafters below. This is because the rafters typically extend in a direction perpendicular to the direction in which metal peaks in the roof extend. As the present system is typically installed onto the metal peaks, it is not also connected into the rafters of the building since the system is often not positioned above the building rafters. Top ends of screws 32 are accessible through holes 24 in base 20. Holes 24 permit the installer to simply tighten screws 32 from above, such that the installer's power driver can face directly downward during the installation process.

As can be seen in FIGS. 2 and 3, photovoltaic module connector 40 can be connected to hook end 23 of the J-shaped elongated base 20 by an attachment screw 42 passing upwardly through a slot 22 in hook end 23 of the J-shaped elongated base. Slot 22 can have a length sufficient to permit attachment screw 42 to pivot slightly back and forth in direction P1 and thereby permit photovoltaic module connector 40 to pivot in direction P1. Optionally, slot 22 can also permit photovoltaic connector 40 to slightly rotate around axis R1, and also to slide slightly back and forth in direction D1 prior to the installer tightening photovoltaic module connector 40 onto attachment screw 42. These adjustment features need not be part of the normal mounting process since screw 42 may typically hold module connector firmly in place during installation. As a result, the installer need not be required to even adjust screw 42 during normal installation. However, the range of movement afforded to connector 40 by slot 22 can provide installation advantages. Moreover, if for some reason a photovoltaic module needs to be removed and re-installed after the array has already been built, the geometry of slot 22 will allow some flexibility both in removing and re-positioning the modules (since base 20 will remain secured onto roof R during removal and re-installation of the defective module).

FIGS. 4 to 7 show an embodiment of the mounting assembly further incorporating an optional rubber gasket system 50 for preventing screws 32 from falling out of the screw holes 24 passing through elongated base 20 during installation. In one embodiment, system 50 can include a pair of flexible (or rigid) screw holders 52 for holding self-tapping screws 32. It is to be understood that different numbers of screws 32 may be used, all keeping within the scope of the present invention. In operation, each flexible screw holder 52 simply holds its associated screw 32 in the downwardly facing orientation shown (with the top head of each screw 32 supported by a flange that extends inwardly around the neck of each screw 32). When the installer tightens screw 32 into the sheet metal below base 20, flexible screw holder 52 will bend/compress in height. As such, as the bottoms of screws 32 pass through bottom holes in extruded base 20, and the top ends of the screw 32 will drop down until the top ends of screws 32 become essentially flush with the top side of the bottom panel of base 20. At this time, flexible screw holder 52 will become substantially, or even fully compressed. The advantage of using flexible screw holders 52 is that screws 32 do not simply fall out of the extruded base 20 when an installer is handling mounting system 10. Rather, the screws remain captive in assembly 10 such that the installer can hold and rotate assembly 10 to attach it onto a photovoltaic module without having to worry about fastening screws 32 ever becoming lost. Moreover, the installer does not have to fumble around looking for fastening screws in their pockets after the mounting assembly 10 has been placed onto roof R. In addition, flexible screw holder 52 remains attached to assembly 10 after screws 32 have been installed. As a result, there are no screw holders littering the jobsite that have to be cleaned up after installation.

Figure 8:
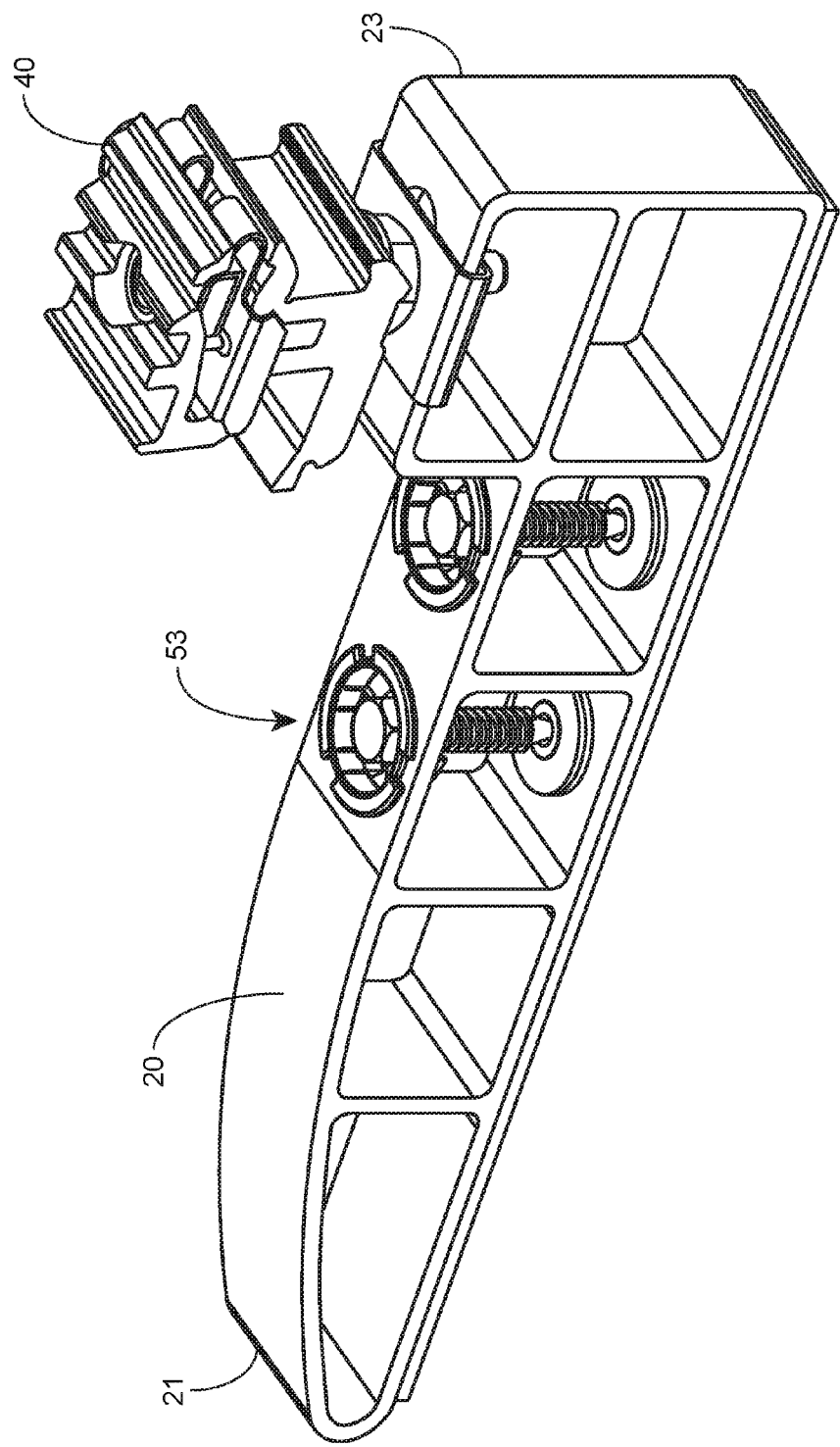
FIG. 8 is a perspective of an alternate embodiment of the assembly showing an optional captive-screw system for attaching a pair of self-tapping screws to the elongated base.
Figure 9A:
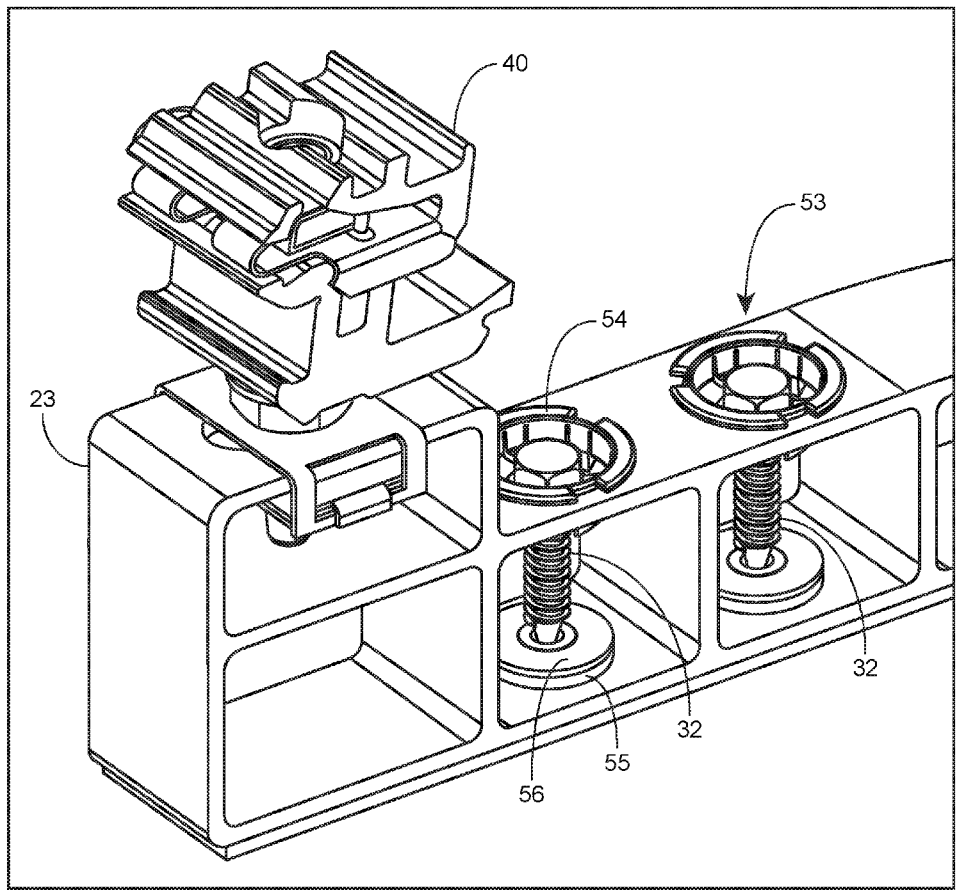
FIGS. 9A and 9B are close-up views of the captive-screw system of FIG. 8.
Figure 9B:
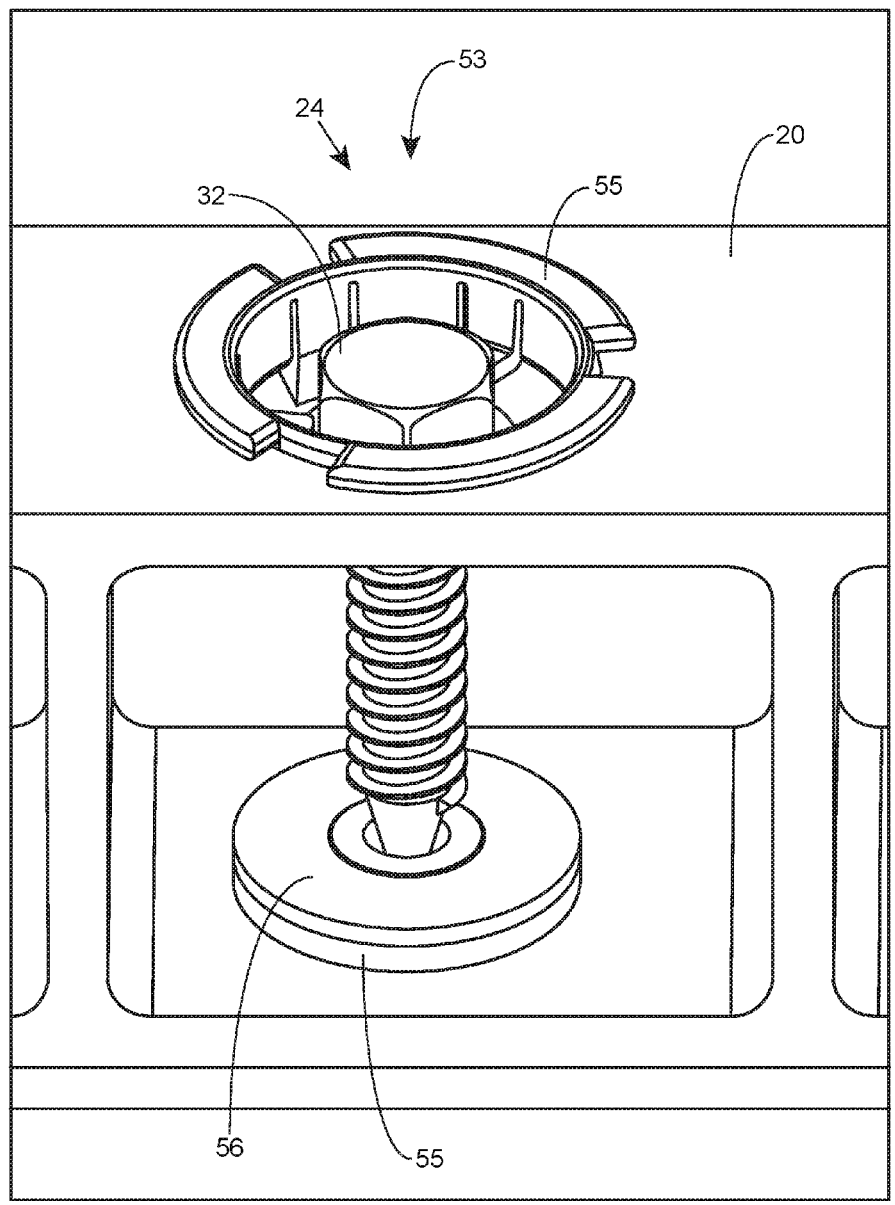

FIGS. 8, 9A and 9B show another optional captive screw holding system 53 for preventing screws 32 from falling out of the screw holes passing through elongated base 20 during installation. Screw holding system 53 may include deformable or breakable support 54 that holds the top end of screw 32 in an upright position with respect to base 20. Foam pad 55 can be positioned underneath support 54 and a gasket 56 (optionally made of EPDM (ethylene propylene diene monomer)) is positioned on top of foam pad 55. In operation, the installer can use a power screwdriver to turn screws 32. When screw 32 begins to turn, the head of screw 32 breaks away from support 54 and tightens down onto gasket 56 and foam pad 55. Foam pads 55 and gaskets 56 operate to provide a support surface for the head of screw 32 when it is screwed downwardly into roof R. As also shown in FIGS. 8, 9A and 9B, tapered end 21 may be gently curved to provide an ergonomically shaped handle for the installer to hold onto. Moreover, the number of internal panels making up the web-like structure can be reduced as compared to the embodiment of FIG. 1. In the embodiment shown in FIGS. 8, 9A and 9B, the internal panels making up the web-type structure can simply be vertical and horizontal.

Deformable or breakable support 54 may include any structure that holds the top ends of screws 32 near the top of base 20 while the bottom ends of screws 32 are near the bottom of base 20. For example, breakable support 54 may include fingers or projections that wrap around the top of screw 32 to hold screw 32 in place. Next, as the installer rotates screw 32 (for example, with a power driver), screw 32 moves downwardly such that the top of screw 32 disconnects from breakable support 54. An advantage of breakable support 54 is that it holds screw 32 regardless of the orientation of assembly 10. Simply put, the installer could hold assembly 10 upside down or sideways, and screw 32 would not fall out of the assembly. Moreover, screw holder 54 can remain in hole 24 for the life of the product. As such screw holders 54 need not be retrieved from the jobsite after installation of the photovoltaic array.

Figure 10:
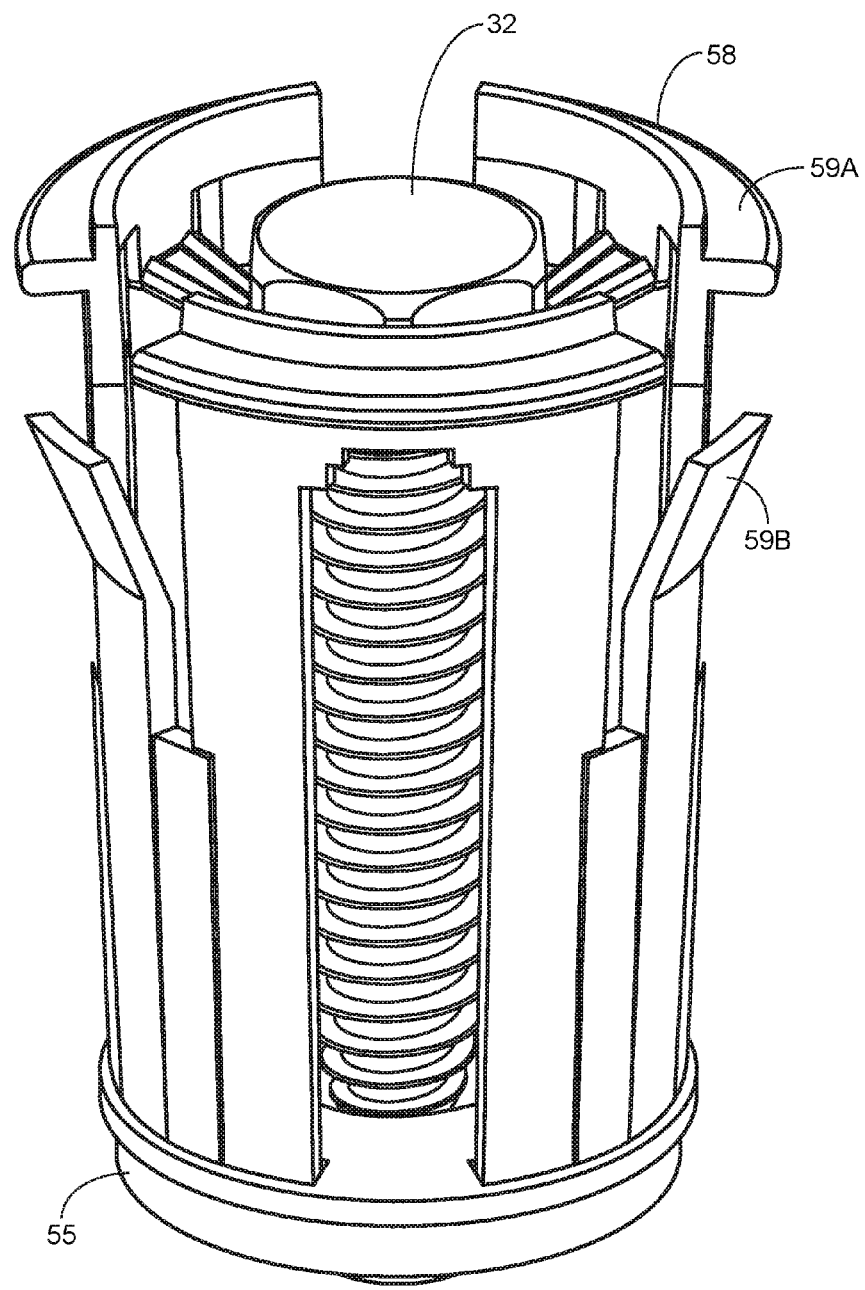
FIG. 10 is an alternate drop-in cartridge embodiment of the captive-screw system of FIG. 8.
Figure 12A:
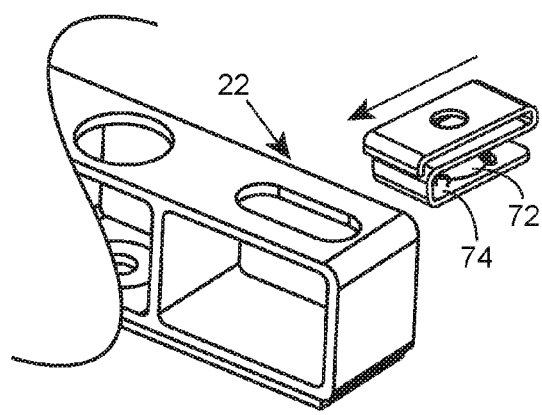
FIGS. 12A-D illustrate installation and positioning of the captive nut system.
Figure 12B:
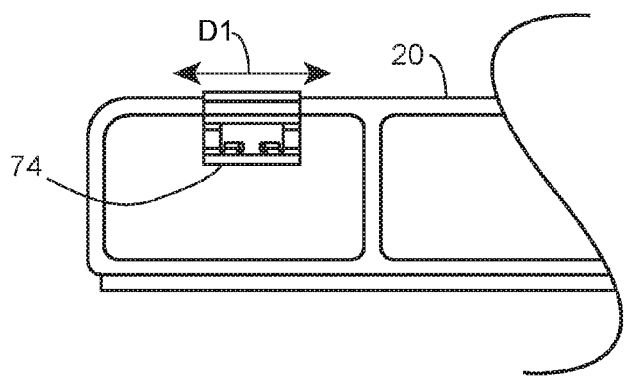
Figure 12C:
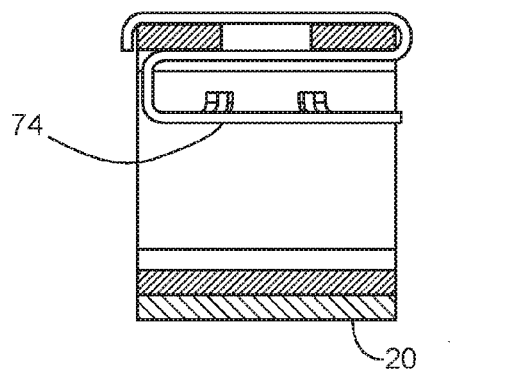
Figure 12D:
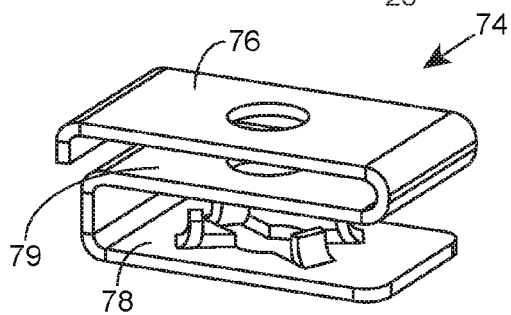

FIG. 10 shows another optional captive fastener system in which screw 32 is supported in a cartridge 58 which is inserted into the same hole 24 that breakable support 54 was inserted in FIGS. 8, 9A and 9B. Cartridge 58 may have upper catches 59A and lower catches 59B. When cartridge 58 is pushed down into hole 24, lower catches 59B spring outwardly to hold cartridge 58 into position, such that cartridge 58 remains within assembly 10. Next, after assembly 10 has been placed onto the roof surface, the installer simply uses a power screwdriver to turn each screw 32, with screw 32 moving down through the bottom of base 20, and into the metal roof below. Similar to breakable support 54 described above, cartridge 58 may include inwardly facing fingers or protrusions that hold onto the top end of screw 32 such that screw 32 does not fall out of cartridge 58 as the installer holds and rotates assembly 10. An advantage of this embodiment is that an installer could replace the entire cartridge 58 in the event of a defective cartridge.

FIG. 11 is an exploded perspective view of system 10 with an optional captive nut and nut holder system 70. Captive nut holder system 70 can include a captive nut 72 and nut holder 74. Nut 72 can provide a location to receive the lower end of bolt 75 which passes through connector 40, washer 77 and nut holder 74. Advantageously, bolt 75 is accessible from directly above assembly 10. As a result, should it be necessary to remove connector 40, an installer can remove connector 40 from assembly 10 when the installer is standing above assembly 10. As shown in FIGS. 12A-D, nut holder 72 can be S-shaped having top flange 76, center flange 79 and bottom flange 78.

In operation, nut holder 74 grabs onto base 20 permitting some sliding movement of nut 72 back and forth under slot 22 in direction D1. Specifically, top flange 76 and center flange 79 of nut holder 74 can be received around the top panel of base 20 as shown, with top flange 76 being curved downwardly at one end to wrap partially around the top panel of base 20. As such, nut holder 74 is slidable along the top panel of base 20.

This sliding motion of nut holder 74 and nut 72 permits connector 40 to slide back and forth slightly in direction D1. This sliding motion adds to the positional adjustability of modules 110 and 120 both during installation. As can be seen, nut holder 74 optionally includes upper flange 76 that is slipped over the top edge of base 20 and lower flange 78 that holds screw 72 therein. Specifically, bottom flange 78 may include upwardly facing projections that hold nut 72, and prevent nut 72 from rotating as bolt 75 is rotated. Such upwardly facing projections on bottom flange 78 may be hex-shaped.

One advantage of bolt 75 passing through connector 40 (and being accessible from above) is that it permits a defective photovoltaic module to be removed after installation. Specifically, as part of removing a column of modules to access the defective module, the installer simply unscrews bolt 75 from above such that connector 40 can be lifted away from base 20, thereby permitting removal of the defective module supported by connector 40. Moreover, another advantage of the present system is that the removal of connector 40 can be accomplished without having to remove base 20 from the surface of roof R. After the repair has been completed (and the defective module has been swapped out for a new module), connector 40 can quickly be re-installed by inserting and tightening screw 75 from above. Furthermore, another advantage of the system is that the length of slot 22 permits connector 40 to be re-installed at a slightly different location with respect to base 20 after the repair. For example, connector 40 can be slid forward or backward slightly in slot 22 in direction D1 prior to bolt 75 being re-tightened into nut 74. This provides added flexibility in case the replacement module is not installed in exactly the same position as the module it is replacing.

Figure 13:
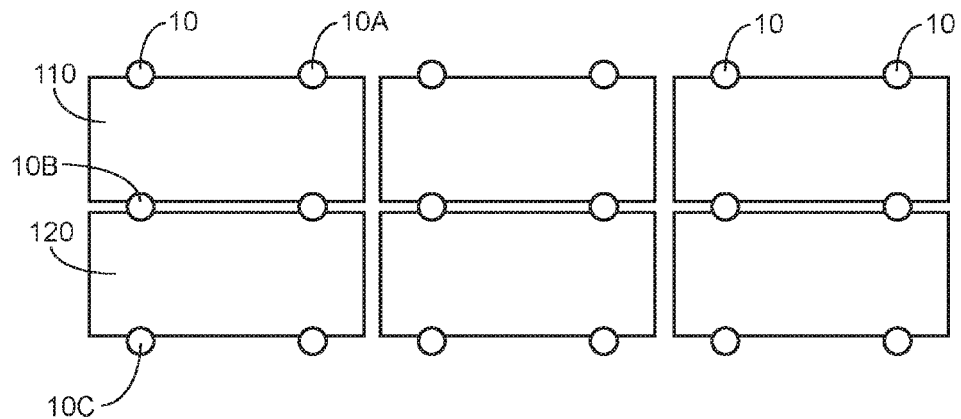
FIG. 13 is a top plan schematic of a photovoltaic array incorporating the present mounting system.
Figure 14:
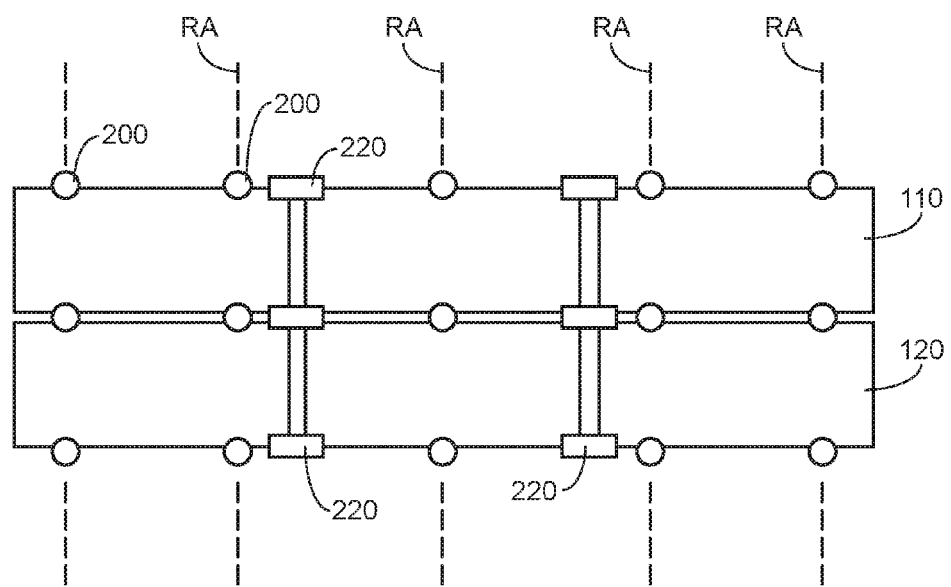
FIG. 14 is top plan schematic of a traditional photovoltaic mounting system.

FIG. 13 is a top plan view of a photovoltaic array incorporating the present mounting system and FIG. 14 is an illustration of a traditional roof mount system for comparison purposes showing further advantages of the present system. In FIG. 13, three columns of photovoltaic modules 110 and 120 are shown installed on a building roof. Modules 110 and 120 are installed as follows. First, a first row of assemblies 10A can be installed onto the roof (assemblies 10A being the same as assemblies 10 as described herein). Next, a first row of modules 110 can be installed onto assembles 10A. Next, a second row of assemblies 10B can be connected onto modules 110 and towered into position on the roof and fastened to it (assemblies 10B also being the same as assemblies 10 as described herein, and the preferred method of installation being the same as was described above with respect to assemblies 10). Then, a second row of modules 120 is then attached onto assemblies 10B (preferably using the installation method as described above). Finally, a third row of assemblies 10C can be connected onto modules 120 and then lowered onto the roof surface for attachment to the roof (assemblies 10C being the same as assemblies 10 as described above). This process can be repeated, adding successive rows of photovoltaic modules to the array. It is to be understood that additional photovoltaic modules can be installed using the above described methods to form the final assembled array. As seen in FIG. 13, each photovoltaic module (110 or 120) is supported at four locations by assemblies 10. As is also seen in FIG. 13, each of the three columns of modules need not be connected to an adjacent column of modules. Instead, each module 110 can be connected to two assemblies (two of 10A and two of 10B), and each module 120 can be connected to two assemblies (two of 10B and two of 10C) However, no module 110 needs to be connected to an adjacent module 110. Similarly, no module 120 needs to be connected to an adjacent module 120. This approach makes installation of the array fast and easy to accomplish, since the installer need only progress along a single column at a time adding additional photovoltaic modules to the column. Moreover, as will be further explained below, the installer is able to progress along the column of modules without having to reach back up over an installed module. This advantage is provided because each assembly 10 is secured to roof R after being secured to the first module 110 and then need not be touched again by the installer when the second module 120 is secured thereto. Rather, the installer can back up on roof R and stand away from assembly 10 when securing second photovoltaic module 120 to assembly 10.

FIG. 14 shows the positioning of a traditional array. Specifically, connectors 200 may be standard feet 200 spaced apart at a preferred distance across the array. The spacing between feet 200 may result in placement of connectors 200 at uneven spacings along the sides of modules 100 and 120. As a result, a second type of connector assembly 220 is required to prevent excessive cantilever in the modules. For example, the middle column of modules 110 and 120 are only connected to the roof by one connector 200 located mid-way along the sides of the modules. A second connector 220 is thus needed at the ends of these modules such that the ends of the modules are supported. Second assembly 220 may be a module-to-module interlock, and need not be supported from below. As can be appreciated by comparing FIGS. 13 and 14, the present system (FIG. 13) only requires one type of assembly (i.e.: assemblies 10), whereas other existing systems (FIG. 14) would specifically require two different types of connecting assemblies (i.e.: connectors 200 and 220). Thus, an advantage of the present system is that only one assembly be required (i.e.: assembly 10) to mount the entire photovoltaic array. This can speed the time to install the array. This can also reduce the cost of materials required to assemble the array. Additionally, with the present system, a placement conflict between two different types of connectors on the same system does not occur. However, as seen in FIG. 14, this placement conflict can easily occur between connectors 200 and 220 in traditional systems. Such placement conflicts typically require additional hardware or hardware that incorporates aspects of both assemblies (i.e.; a mechanism incorporating elements of connectors 200 and 220 within the same assembly).

Figure 15A:
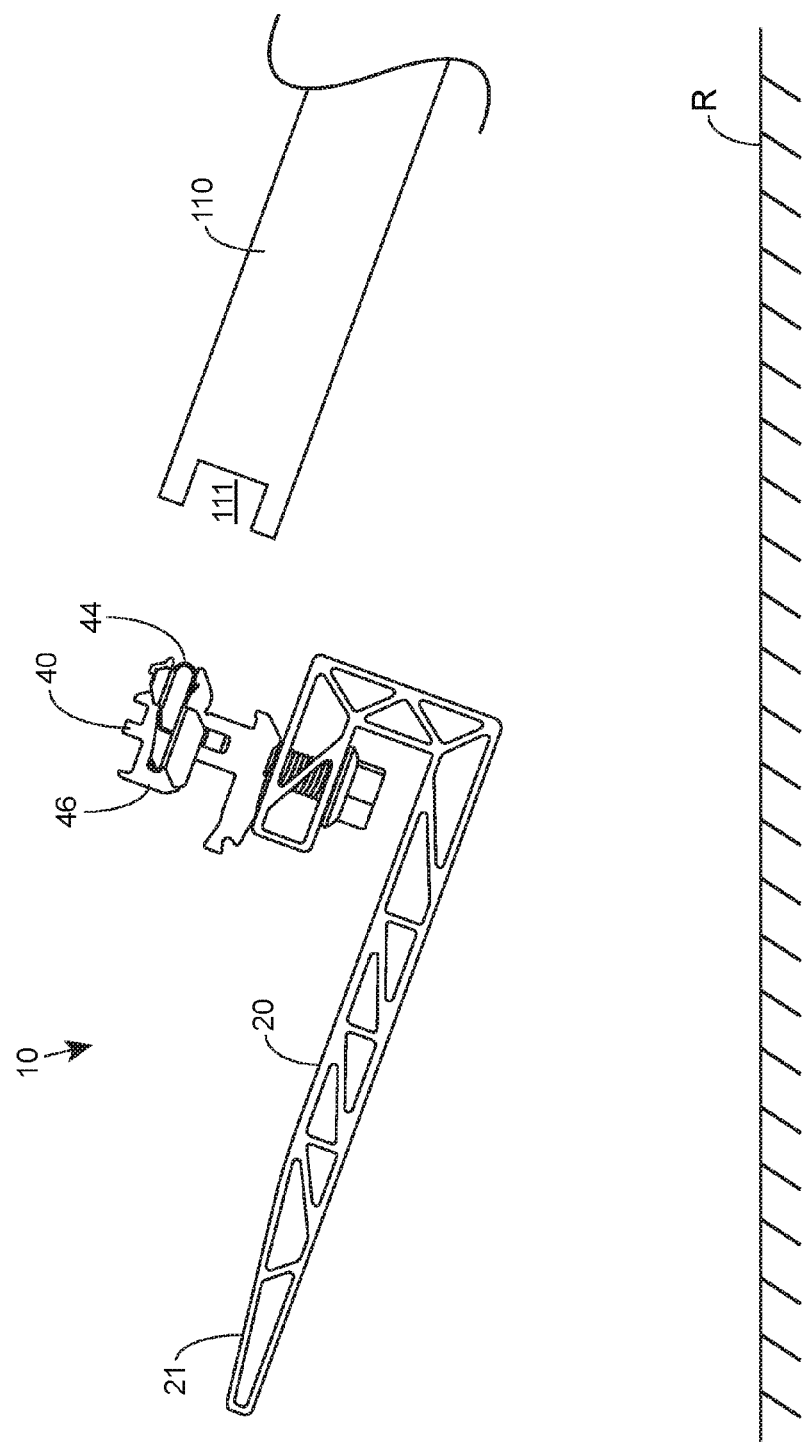
FIG. 15A is a first step in assembling a photovoltaic array using the present mounting system.

Installation of assembly 10 is shown in successive FIGS. 15A to 15F, described below:

FIG. 15A shows edge of first photovoltaic module 110 as it can be held in the air above the roof surface by the installer (e.g.: with one hand) above roof surface R while holding mounting system 10 with the other hand. The installer need not lift first photovoltaic module 110 very high above roof surface R. Rather, first photovoltaic module 110 need only be lifted a distance sufficient for the installer to rotatable lock connector 40 onto module 110, as follows.

Figure 15B:
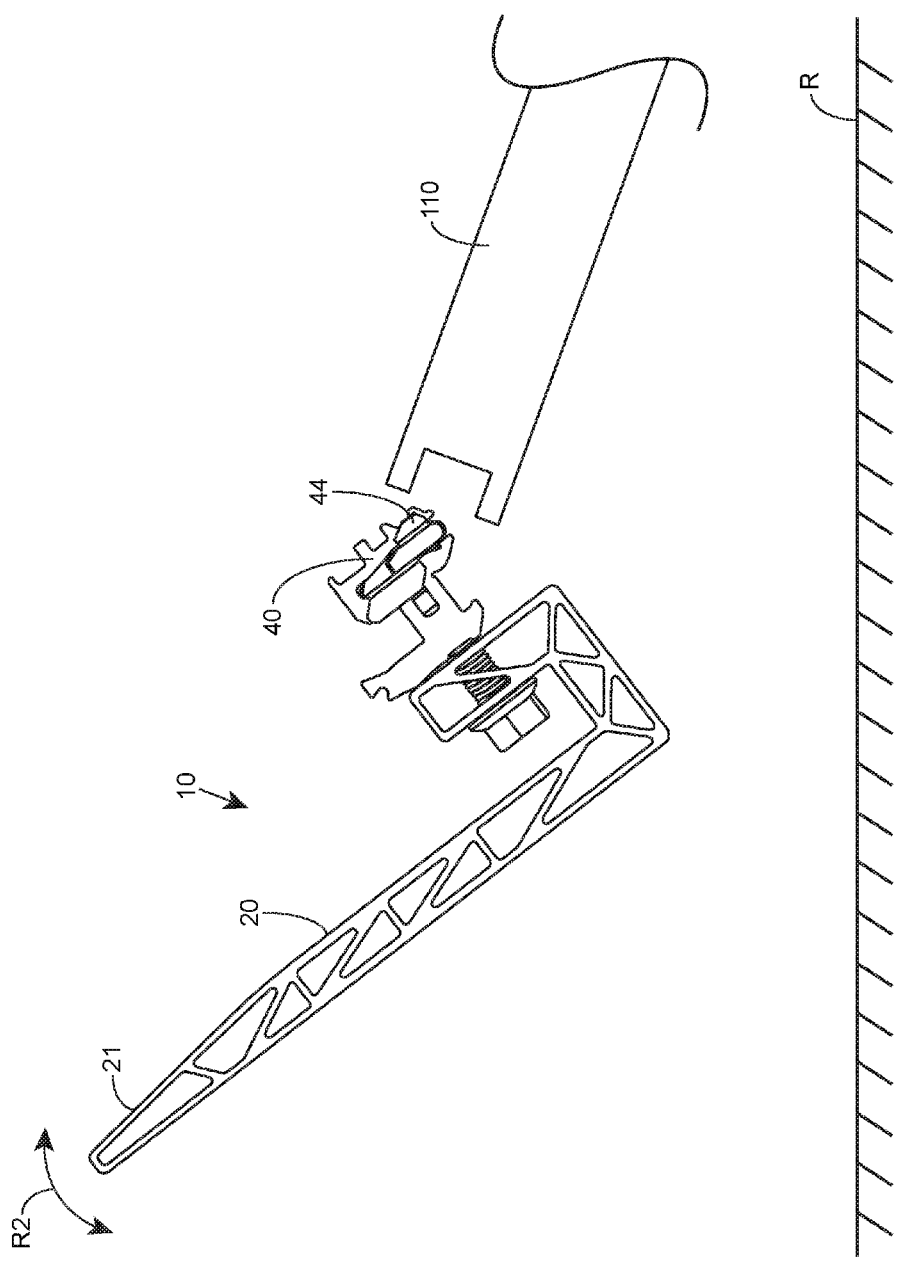
FIG. 15B is a second step in assembling a photovoltaic array using the present mounting system.
Figure 15C:
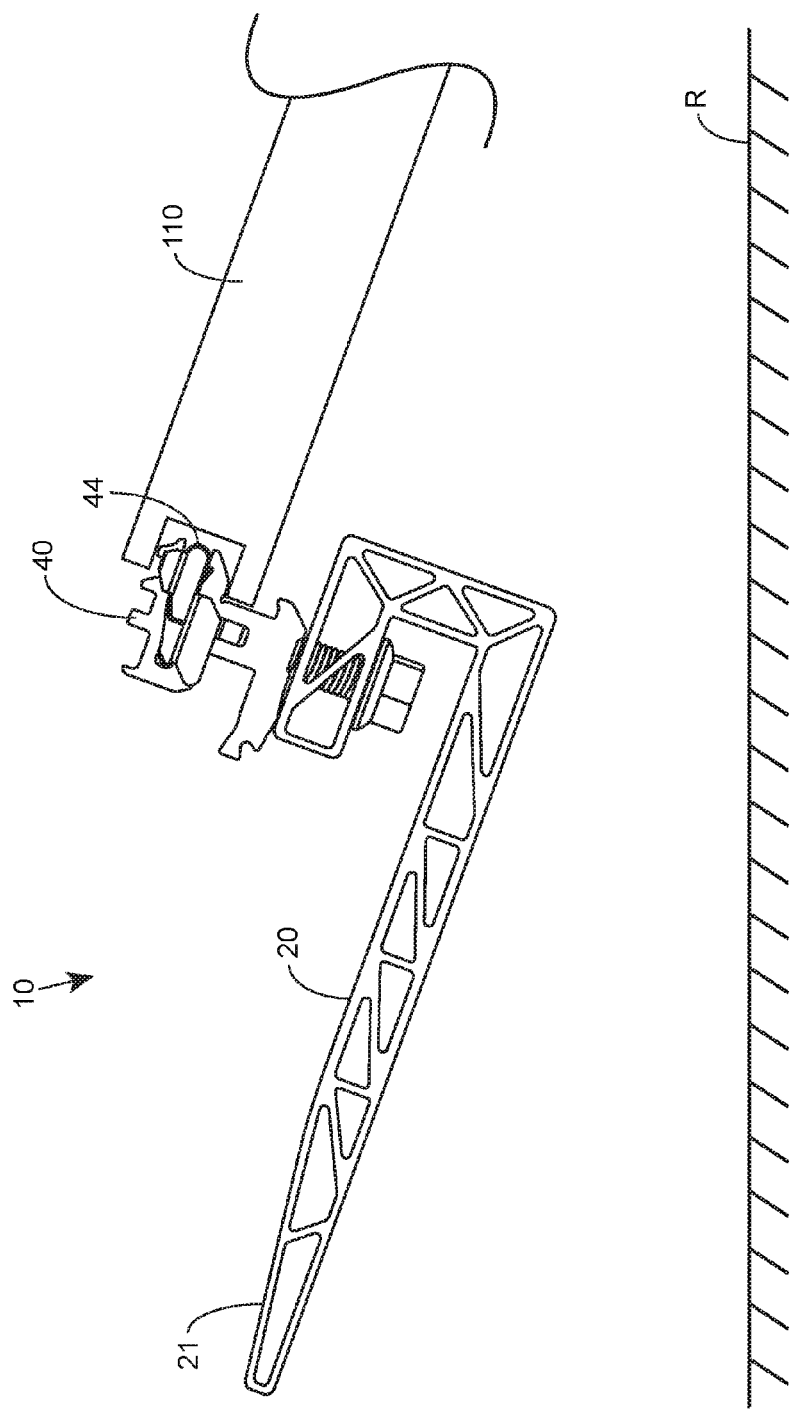
FIG. 15C is a third step in assembling a photovoltaic array using the present mounting system.

FIGS. 15B and 15C shows sequential steps in which the installer can rotate base 20 and connector 40 with respect to first photovoltaic module 110 such that connector 40 rotatably locks onto or into an edge of first photovoltaic module 110. The installer can simply hold the edge of the first photovoltaic module 110 away from the roof surface with one hand and rotatably lock connector 40 onto the edge of first photovoltaic module 110 with the other hand.

In one preferred embodiment, connector 40 can be the type of connector described in Published U.S. Patent Application 2014/0175244, entitled "Connecting Component For Photovoltaic Arrays" which is designed to receive first and second photovoltaic modules on opposite sides thereof, wherein the modules have side edges that are pivot-locked onto the connector.

Specifically, this process of attaching connector 40 onto the side edge of module 110 may optionally comprise inserting tongue 44 on connector 40 into side groove 111 in first photovoltaic module 110 and then rotating connector 40 to lock the connector onto first photovoltaic module 110. However, in alternate embodiments, the present system can be used with modules that do not have grooved frames. For example, connector 40 can instead be a connector that wraps around the top and bottom edges of the module frame, or a pinch-style connector, or a connector into which the edges of the module frames are inserted. Optionally, connector 40 may also be a connector used with frameless modules.

Elongated base 20 can be narrow with tapered end 21 acting as a lever when held by an installer and rotated by hand to lock onto first photovoltaic module 110. Specifically, rotatably locking connector 40 into or onto the edge of first photovoltaic module 110 can involve manually rotating the elongated base 20 downwardly in direction R2 such that connector 40 snaps onto, or into, or around, the side edge first photovoltaic module 110. As such, the present reference to "rotatably connecting" can be understood to involve any motion in which connector 40 is moved with respect to first photovoltaic module 110 to connect connector 40 onto the side edge of first photovoltaic module 110.

FIG. 15D shows how an installer can next lower the edge of first photovoltaic module 110 such that elongated base 20 (and its optional sealing base 25 below) are now sitting on roof R. At this time, the installer can use a power tool to tighten screws 32, thereby securing elongated base 20 directly onto metal roof R. At this time, the installer can also adjust the position of screw 42 (FIG. 3) or bolt 75 (FIG. 11) back and forth in direction D1 within slot 22, and can also adjust the rotation angle of connector 40 around axis R1 so as to ensure the best placement of connector 40 onto the edge of first photovoltaic module 110. Screws 32 can be positioned rather close to connector 40 along the length of base 20 as shown. An advantage of this placement of screws 32 is that a shorter lever arm is provided, such that lateral forces (i.e.; forces parallel to the roof surface) on connector 40 do not tend to pull screws 32 out of the roof.

Figure 15E:
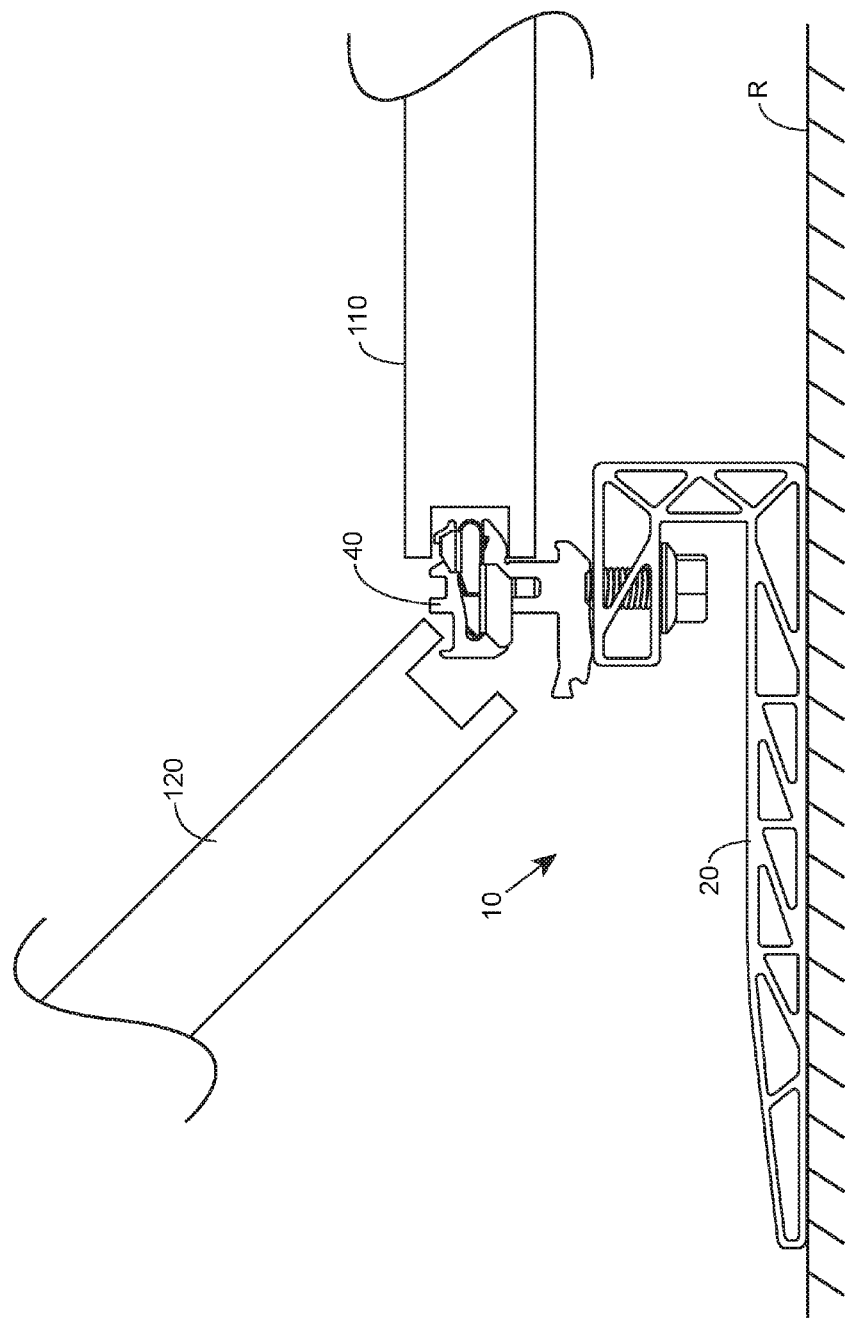
FIG. 15E is a fifth step in assembling a photovoltaic array using the present mounting system.
Figure 15F:
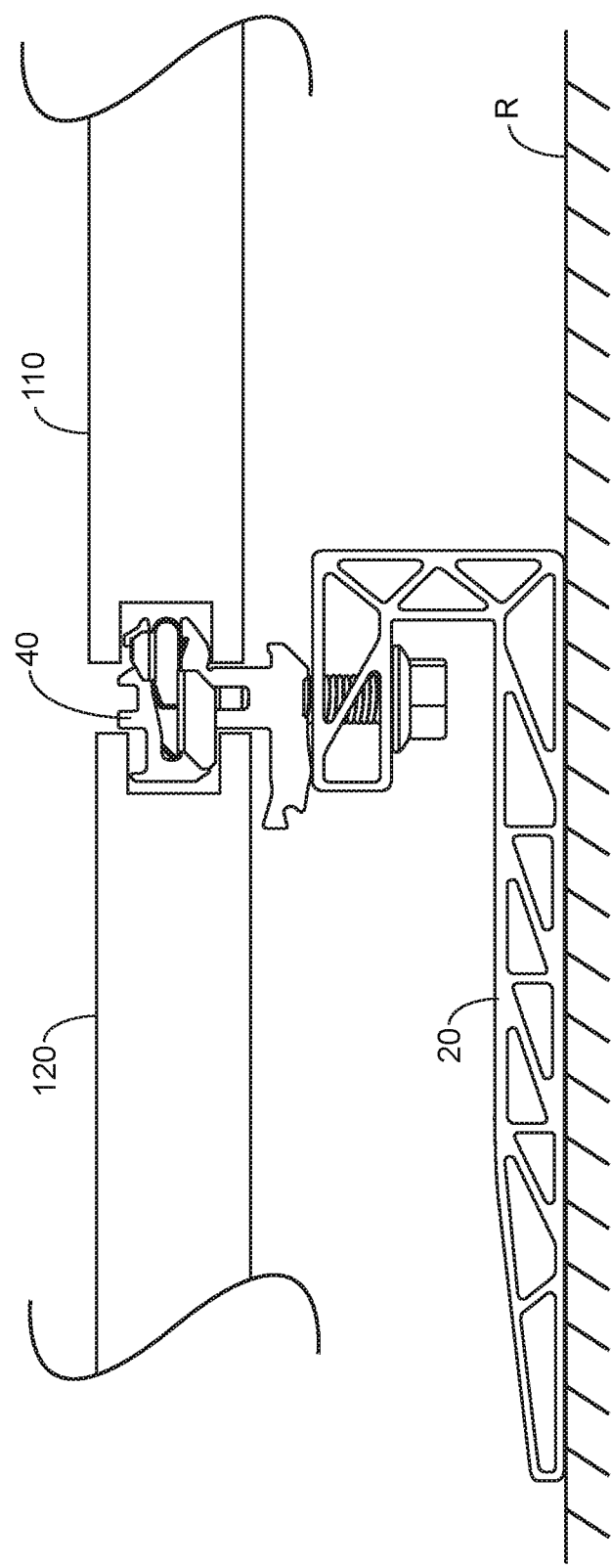
FIG. 15F is a sixth step in assembling a photovoltaic array using the present mounting system.

FIG. 15E shows how the edge of the second photovoltaic module 120 can be rotatably attached onto connector 40 on a side opposite to that of first photovoltaic module 110. First, an edge of second photovoltaic module 120 is placed onto connector 40 when the second photovoltaic module is held at an angle to the roof surface, as shown. Finally as shown in FIG. 15F, second photovoltaic module 120 is rotated downwardly towards the roof, thereby attaching second photovoltaic module 120 onto connector 40.

The above described technique can be simply repeated with second module 120 becoming first module 110 in the next module position of the array. As a result, the array can be built rapidly with mounting system 10 being a system that is simply snapped onto a first photovoltaic module and then used as a base for receiving a second photovoltaic module thereon.

What is claimed is:

1. A photovoltaic mounting system, comprising:
   an elongated base;
   an attachment mechanism on the elongated base for attaching the elongated base onto a roof; and
   a photovoltaic module connector mounted at a first end of the elongated base, the connector being dimensioned to support a first and a second photovoltaic module on opposite sides thereof,
   wherein the connector is rotatably lockable onto the first photovoltaic module when the elongated base is held and rotated with respect to the first photovoltaic module,
   wherein the connector receives the second photovoltaic module when the elongated base is positioned on the roof and the connector is locked onto the first photovoltaic module, and
   wherein the attachment mechanism on the elongated base further comprises a break-away screw holder securing a self-tapping screw onto the elongated base.

2. The photovoltaic mounting system of claim 1, wherein the elongated base acts as a lever when held by an installer and rotated downwardly by hand to lock onto the first photovoltaic module.

3. The photovoltaic mounting system of claim 1, further comprising:
   a sealing base positioned between the bottom of the elongated base and the roof.

4. The photovoltaic mounting system of claim 1, wherein the elongated base is J-shaped, and the photovoltaic module connector is mounted onto the hook end of the J-shaped base.

5. The photovoltaic mounting system of claim 4, wherein the photovoltaic module connector is connected onto the hook end of the J-shaped elongated base by an attachment screw passing through a slot in the hook end of the J-shaped elongated base.

6. The photovoltaic mounting system of claim 5, wherein the slot permits the photovoltaic module connector to move, rotate and pivot prior to tightening the photovoltaic module connector onto the attachment screw.

7. The photovoltaic mounting system of claim 1, wherein a second end of the elongated base is tapered.

8. A photovoltaic mounting system comprising:
   a base;
   a photovoltaic module connector mounted onto the base, the connector being dimensioned to support a first and a second photovoltaic module on opposite sides thereof; and
   at least one self-tapping screw in the base, wherein the at least one self-tapping screw is held within the base prior to attachment of the base onto a roof surface,
   wherein the base comprises a break-away screw holder securing the at least one self-tapping screw onto the base, wherein the elongated base is J-shaped, and the photovoltaic module connector is mounted onto the hook end of the J-shaped base.

9. The photovoltaic mounting system of claim 8, wherein the base acts as a lever when held by an installer and rotated downwardly by hand to lock onto the first photovoltaic module.

* * * * *